(12) United States Patent
Krütten

(10) Patent No.: US 8,592,707 B2
(45) Date of Patent: Nov. 26, 2013

(54) ELECTRICAL SWITCH WITH A CONTACT ELEMENT MOUNTED SUCH THAT IT CAN ROTATE

(75) Inventor: Viktor Krütten, Hünstetten (DE)

(73) Assignee: IDS-Technology GmbH, Bitburg (DE)

( * ) Notice: Subject to any disclaimer, the term of this patent is extended or adjusted under 35 U.S.C. 154(b) by 152 days.

(21) Appl. No.: 12/519,089

(22) PCT Filed: Dec. 3, 2007

(86) PCT No.: PCT/EP2007/010477
§ 371 (c)(1),
(2), (4) Date: Nov. 15, 2010

(87) PCT Pub. No.: WO2008/071320
PCT Pub. Date: Jun. 19, 2008

(65) Prior Publication Data
US 2011/0042190 A1 Feb. 24, 2011

(30) Foreign Application Priority Data

Dec. 14, 2006 (DE) .......................... 10 2006 059 466

(51) Int. Cl.
*H01H 19/20* (2006.01)
(52) U.S. Cl.
USPC ....................................... 200/570; 200/50.34
(58) Field of Classification Search
USPC ................ 200/17 R, 18, 570, 564, 50.34, 5 R
See application file for complete search history.

(56) References Cited

U.S. PATENT DOCUMENTS

| | | | | |
|---|---|---|---|---|
| 2,335,388 A * | 11/1943 | Zollner et al. | ................. | 200/570 |
| 3,940,584 A * | 2/1976 | Cauldwell et al. | ............. | 200/504 |
| 4,268,890 A * | 5/1981 | Silbermann | ................... | 200/570 |
| 4,399,336 A * | 8/1983 | Greve | ......................... | 200/11 R |
| 4,914,262 A * | 4/1990 | Appleton | ...................... | 200/8 R |
| 8,153,916 B2 * | 4/2012 | Lindsey et al. | ........... | 200/11 TC |

FOREIGN PATENT DOCUMENTS

| | | |
|---|---|---|
| DE | 2600368 | 7/1977 |
| EP | 0646938 | 4/1995 |
| WO | WO-02065494 | 8/2002 |

OTHER PUBLICATIONS

English language translation of the International Preliminary Report on Patentability issued in related International Application No. PCT/EP2007/010477.

* cited by examiner

*Primary Examiner* — Felix O Figueroa
(74) *Attorney, Agent, or Firm* — Novak Druce Connolly Bove + Quigg LLP

(57) ABSTRACT

An electrical switch for electrical coupling of an electrical conductor to a busbar may include a contact element and an adjusting device, with the adjusting device moving the contact element during closing and opening of the switch, with the adjusting device rotating or pivoting the contact element, at least when the contact element is being lifted off the busbar.

9 Claims, 17 Drawing Sheets

Figure 1A:
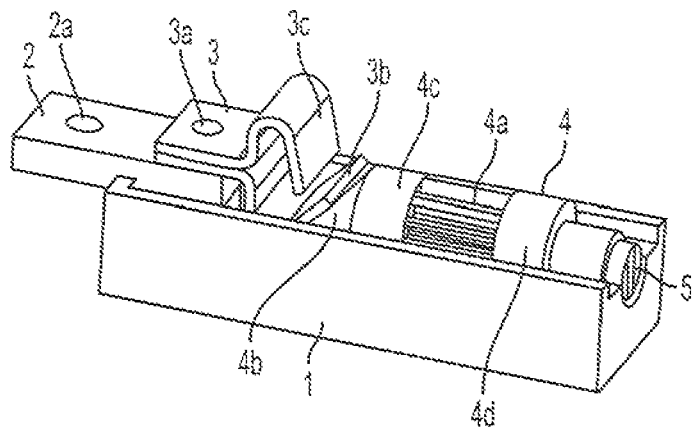

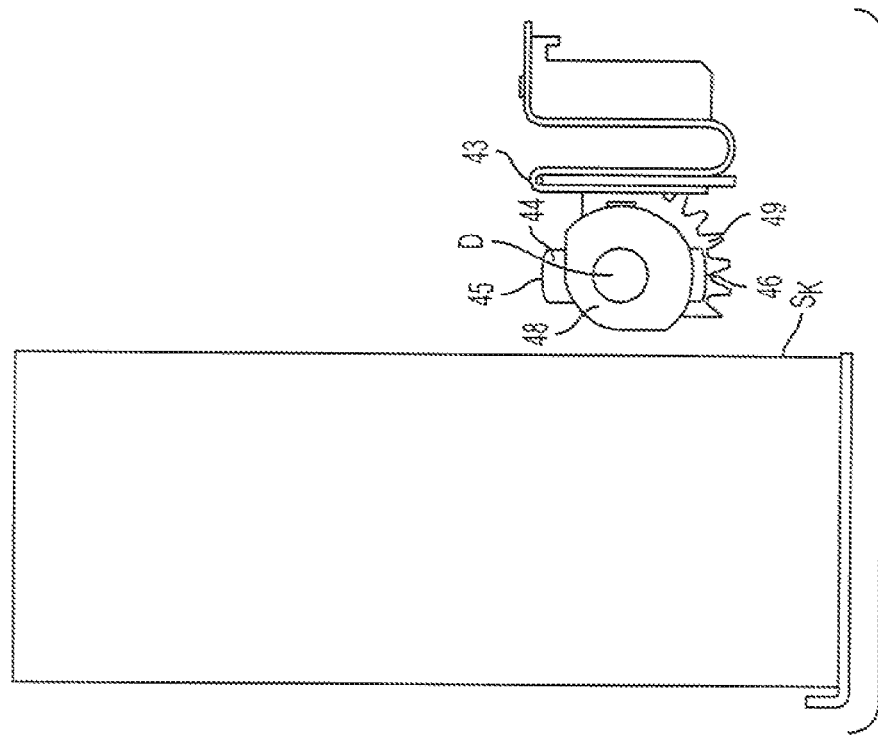
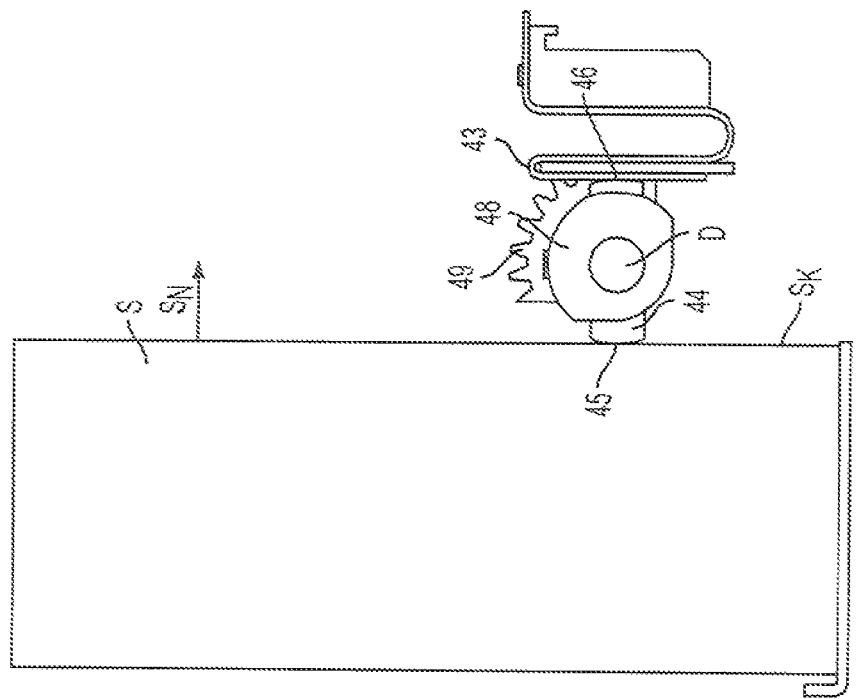

ELECTRICAL SWITCH WITH A CONTACT ELEMENT MOUNTED SUCH THAT IT CAN ROTATE

CROSS REFERENCE TO RELATED APPLICATIONS

This application is a national phase of PCT/EP2007/010477, filed on Dec. 3, 2007, which claims priority to German Application No. 10 2006 059 466.5, filed Dec. 14, 2006, the entire contents of both of which are hereby incorporated by reference.

The invention relates to an electrical switch according to the preamble of claim 1.

The majority of the contacting techniques used employ a plugging technique, that is, contact with the busbar is established by means of a plug which is pushed onto the busbar, enclosing the bar on both sides. This plugging technique requires a constructionally large volume for contacting and is relatively open and difficult to seal off. Arcing faults that are created spread into neighboring regions relatively easily, thus destroying entire switching panels or control units.

A switch is known from EP 0 646 938 A1 in which a contact element comprises on each of its two ends one contact surface, respectively, for contacting with fixedly disposed connecting leads. The contact element is mounted pivotably about an axis, with the contact surfaces being set onto the contact surfaces of the connecting leads or lifted off from them when the contact element is pivoted. If weld connections of the contact surfaces occur, very large forces are required for breaking up the weld connections.

A pivotably mounted contact element is also known from WO 02/065494 A1, which in its function and movement roughly corresponds to the contact element EP 0 646 938 A1

In addition to the plugging technique, a slide-in module for a switching system is known from EP 1 318 584, in which the contact elements of the electrical switches are configured to be resilient and are pressed against the busbar.

It is a drawback of the above-described contacting techniques that the forces of the drive mechanisms are insufficient for adjusting the contact elements in order to break up possible weld connections. Depending on the strength of the weld connection, the contacts as a rule have to be broken up manually using manual tools. Depending of the type of switching panel, the consequence of this is the destruction of the current conduction unit and can only be carried out off-circuit.

In the above-described plugging technique, good contacting reliability can only be realized with a relatively great effort. If constructive tolerances or incorrect constructional dimensions occur, the switching framework will be deformed upon closing. The consequence of this is that the contact element is not located optimally anymore in relation to the busbar and that therefore, contact to the busbar is not completely established, which in turn causes faulty contacting to the point of sparking arcing faults.

It is therefore the object of the present invention to provide an electric switch for coupling an electrical conductor to a busbar in which the contact element can be reliably lifted off from the busbar even in the case of slight weld connections of the contact element to the busbar.

This object is achieved according to the invention with a switch according to the preamble of claim 1, which additionally comprises an adjustment device for lifting the contact element off from the busbar, wherein the adjustment device rotates or pivots the contact element about the surface normal of the contact surface or the longitudinal axis of the contact element.

The electrical switch according to the invention does not employ a plugging technique but a contact technique. The busbar is not enclosed any more, but rather contacted only on one side. The result of this is a minimal contacting volume and a simple effective sealing from the other functional areas.

If the electrical switch is closed, the contact element is advantageously pressed in a spring-loaded manner against the busbar so that possible fabrication tolerances or a shortening of the contact element due to burn-up is compensated. The spring element is advantageously configured such that, because of the Lorentz force, the contact pressure is dynamically enhanced by the magnetic field which acts on the conductive spring element in the inner contact area, pressing the contact element firmly against the busbar in case of a short circuit. The contacts are thus advantageously prevented from being lifted off.

As was already described, the contact element, at least during the initial movement when being lifted off the busbar, is rotated about the contact surface and simultaneously or subsequently moved away from the busbar. If a contact weld has occurred, it is advantageously disconnected reliably and without auxiliary means due to the high torque during the rotational movement with the rotating mechanism provided. The rotational movement is uncoupled in the process. There is no movement of the connecting lead of the contact element. The rotation does not have to take place inevitably. In an advantageous embodiment, it only takes place when the contacts are bonded together.

Several electrical switches according to the invention can be disposed in a current module unit. In this case, the switches are arranged in particular next to one another such that they can be adjusted simultaneously by, for example, a single actuating element, in particular through a common shaft. It is of course also possible that the individual switches or groups of switches are driven by separate drives.

In a particularly advantageous embodiment, the contact elements comprise a toothing which cooperates with a toothed rack. The toothed rack can operate or rotate both a single as well as several electrical switches. During opening or closing, the toothed rack causes the contact element to rotate, wherein the contact element, because of the rotation, adjusts the contact element along its axis of rotation by means of guide surfaces and/or switch guides, whereby it is moved towards the busbar or lifted off from the busbar. In this case, the toothing is to be configured such that the toothed rack is able to slide over the toothing in the axial direction of the contact element, or that the contact element is able to slide under the axially fixed toothed rack with the toothing. This means that the width of the toothing has to be adapted to the switching stroke of the contact element. The movement in the direction of the axis of rotation of the contact element does not have to be inevitable, and positively controlled through guide surfaces or guide slots over the entire stroke of the contact element. Rather, a partial stroke alone can take place caused by spring forces that act on the contact element in the axial direction.

The contact element of the electrical switch according to the invention in one possible embodiment cooperates with a contact spring rigidly connected with an electrical conductor to be connected to the busbar. In this case, the resilient contact element, in an advantageous embodiment, has a contact surface which is inclined relative to the axis of rotation of the contact element. The contact element itself has an obliquely cut end that cooperates with the pressure surface of the resilient element. In this case, the angle of the oblique end of the contact element is configured such that the inclined pressure surface of the resilient element rests on the end of the contact element when the switching element is open. If the contact element is rotated out of its initial position (open switch) about its axis, the contact element presses against the inclined pressure surface of the elastic supporting element with its oblique edge and/or tip. Because the supporting element is only able to draw back in a limited extent because of the spring force, the contact element is moved in the direction of the busbar by further rotation about its axis until it comes up against the busbar. Only then is the spring tightened to maximum spring force with the remaining rotational travel of the contact element. Due to the fact that the driving toothed rack is able to slide axially along the toothing of the contact element (or vice versa), the contact element is pressed in a spring-loaded manner by the resilient supporting element in the closed switch position.

The switch contact is opened by the contact element being rotated back by the drive using the toothed rack, whereby possible weld connections are broken up. The contact element is lifted off from the busbar by means of guide surfaces or switch guides.

Advantageously, the electrical switch according to the invention can be built into any housing or switch panel without them losing their high safety requirements, due to its small dimensions and small number of parts. The electrical switch can be replaced as a single part, so that a simple and cost-effective repair of housings or switch panels that are already mounted is possible. The electrical switch according to the invention can be used in power plants, medical engineering, basic industry, chemical industry or also, generally, in the field of low and medium voltage engineering.

It is of course possible that the contact element does not have to be driven only by a toothed rack. It is also possible that the contact element cooperates directly with the sprocket of a drive, wherein the sprocket in that case can slide along the toothing of the contact element in the axial direction. It is also possible that the contact element can be made to rotate, for example, by means of toothed belts or other drives in order to open or close the switching element.

The electrical switch according to the invention can advantageously be attached by positive fit to the busbar holder or the busbar itself, with the positive fit acting in particular in the direction of the stroke of the contact element.

It is also possible that a contact element is disposed on a rotatable shaft, with the contact element itself being displaceably mounted in or on the shaft. It is thus possible to mount several contact elements of several adjacently arranged switches on the shaft. In order for the contact element to be rotated about the surface normal of the busbar contact surface when it is lifted off, the shaft or a mounting part attached thereto comprises a guide slot or resting surfaces that cause a rotation or tilting of the contact element during the rotation of the shaft, whereby the possibly bonded contact element is tilted or rotated about the surface normal, thus reliably breaking up the bond. Subsequently, the contact element can be reliably pivoted into the open switch position.

Various embodiments of the electrical switch according to the invention are explained below in more detail with reference to drawings.

Figure 3A:
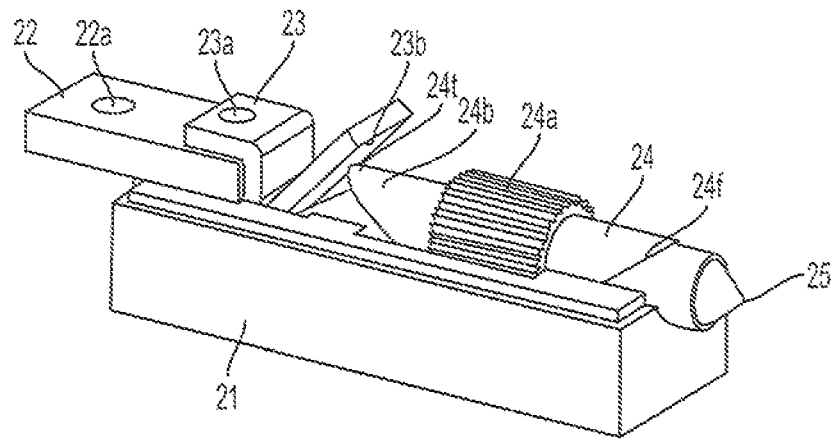
Figure 3B:
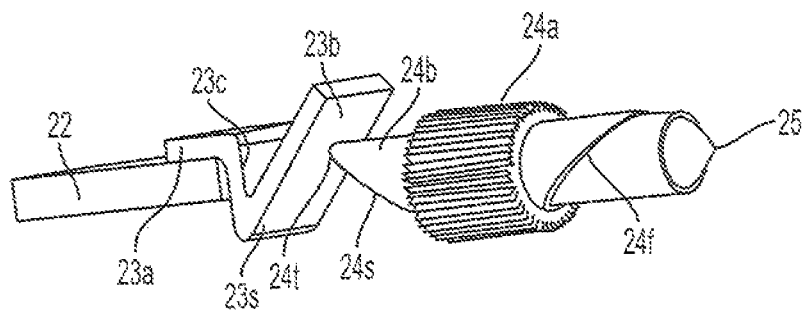
Figure 3C:
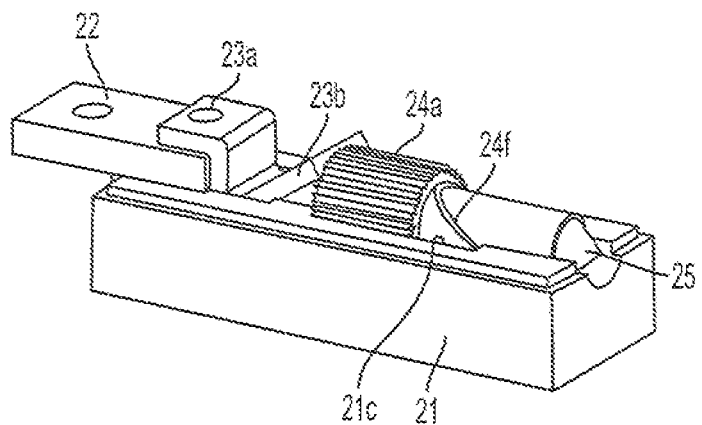
Figure 4:
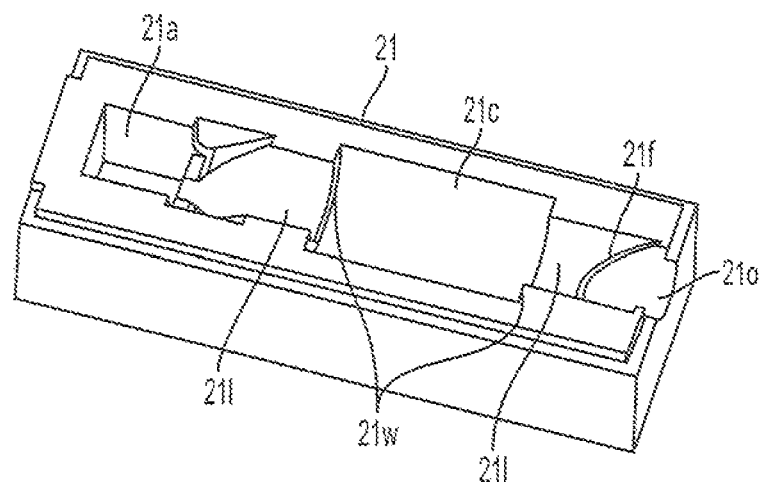
Figure 5:
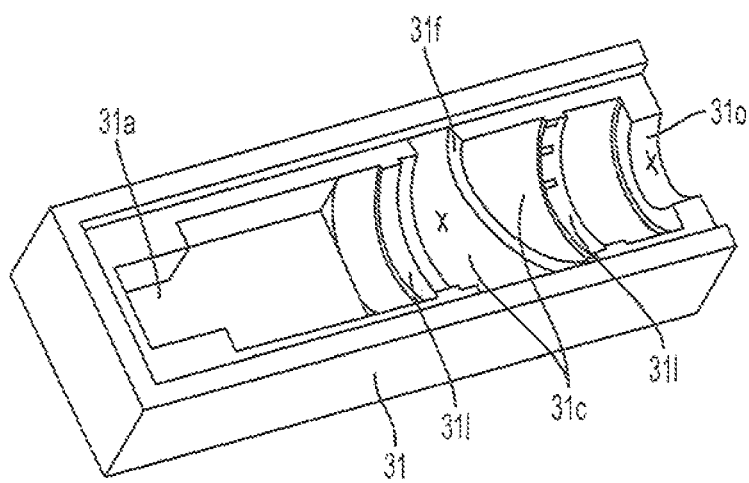
Figure 6A:
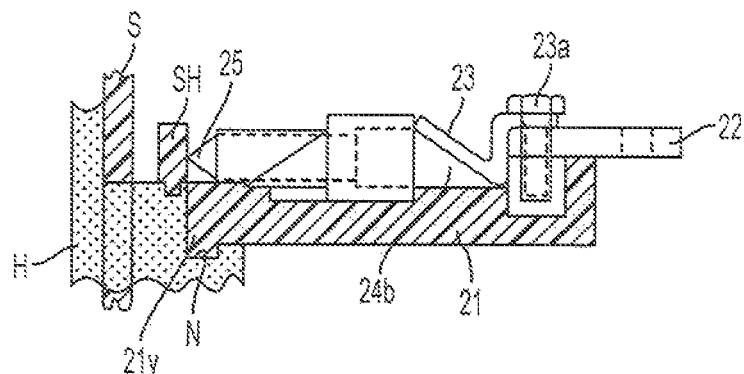
Figure 6B:
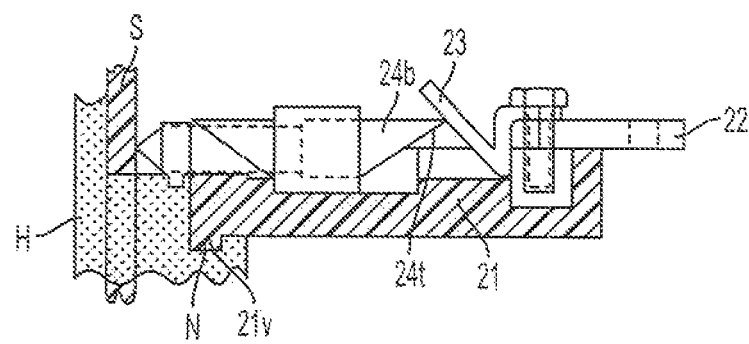
Figure 7:
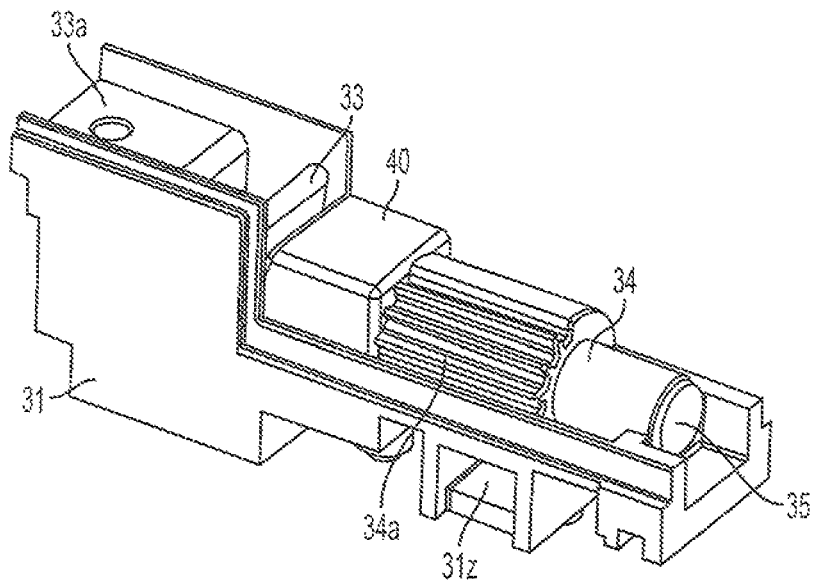
Figure 7A:
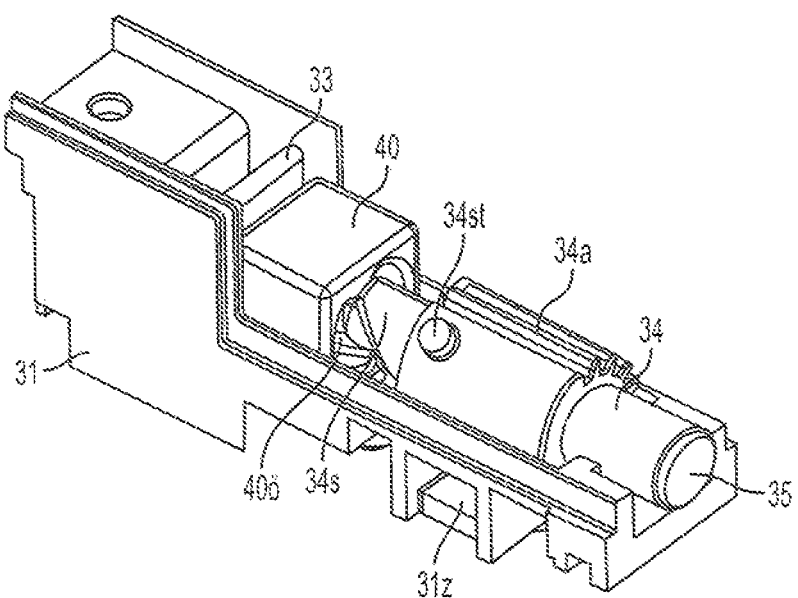
Figure 8:
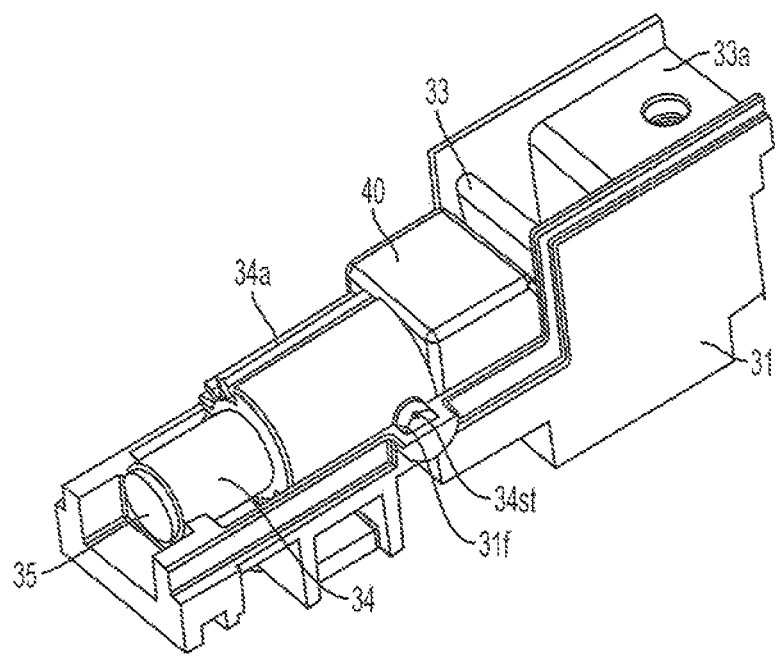
Figure 9:
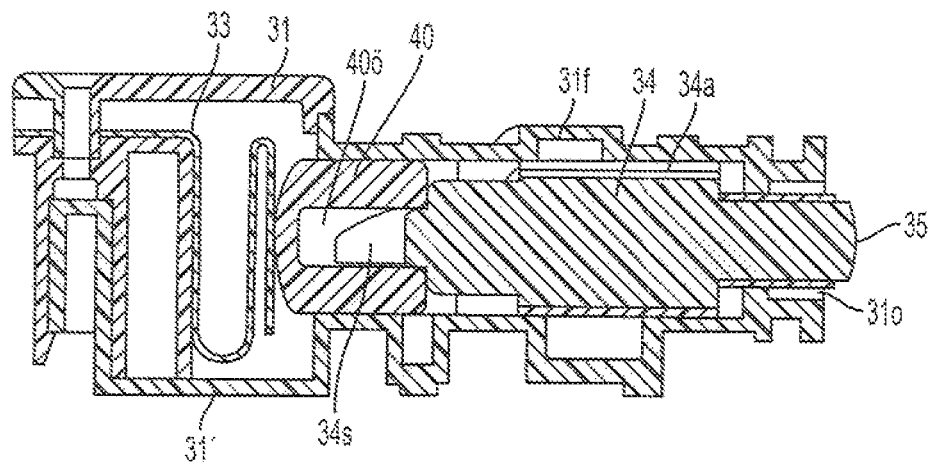
Figure 9A:
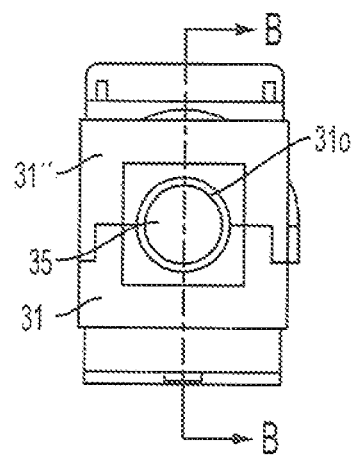
Figure 10:
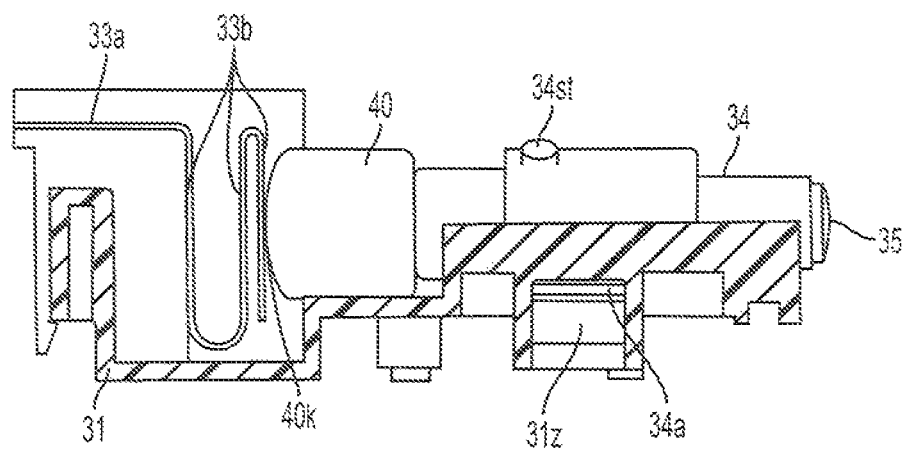
Figure 11:
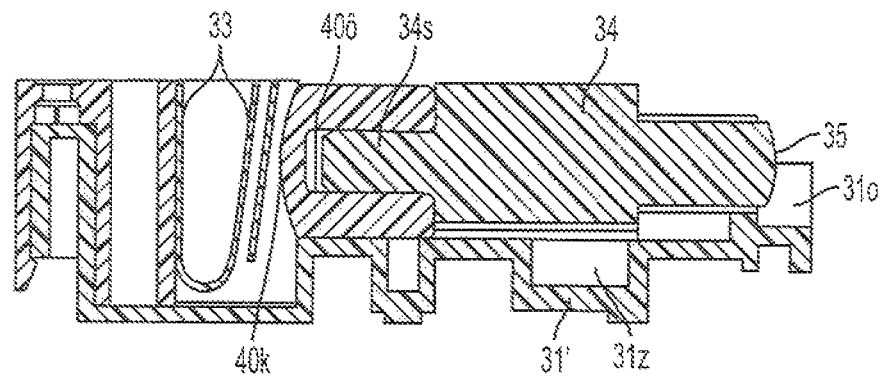
Figure 11A:
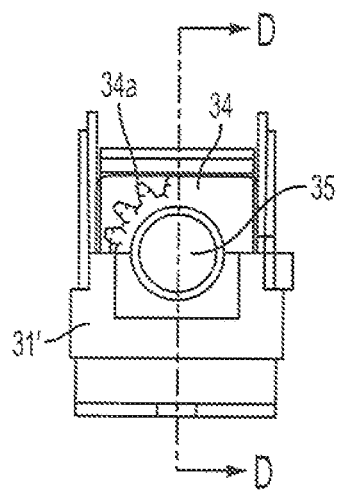
Figure 12:
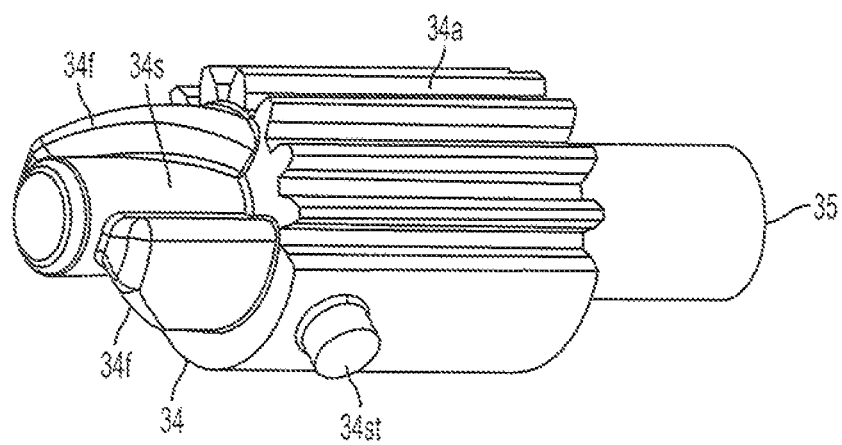
Figure 13A:
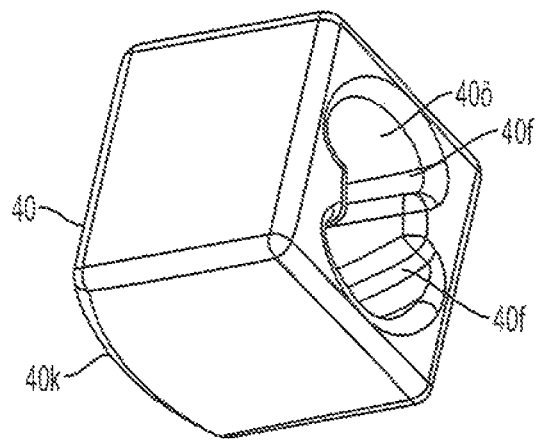
Figure 13B:
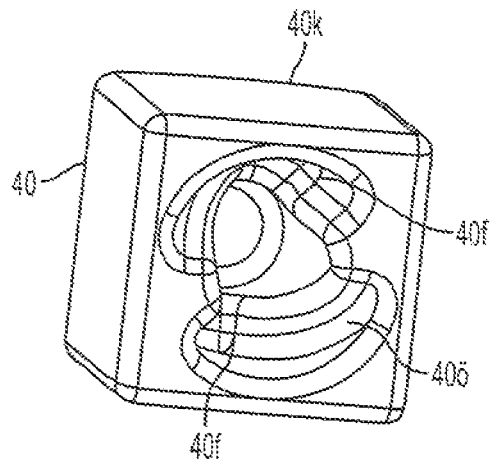
Figure 14A:
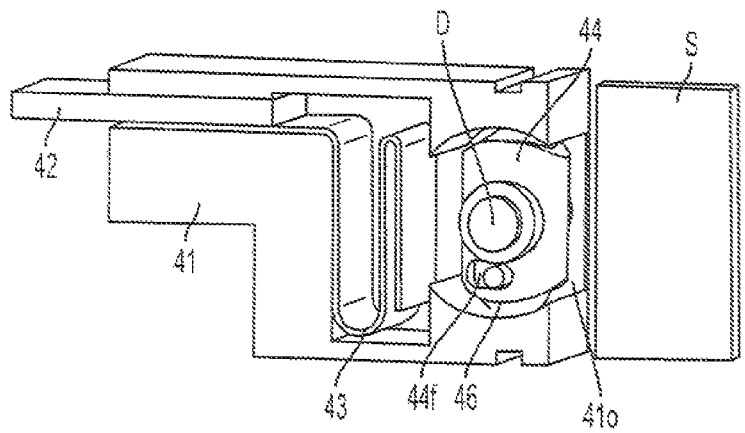
Figure 14B:
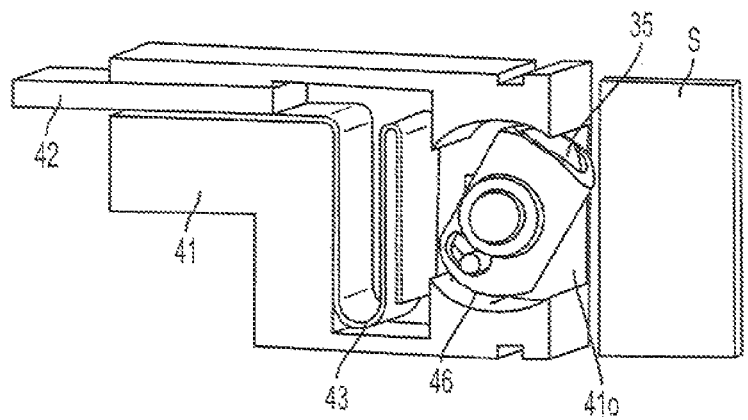
Figure 14C:
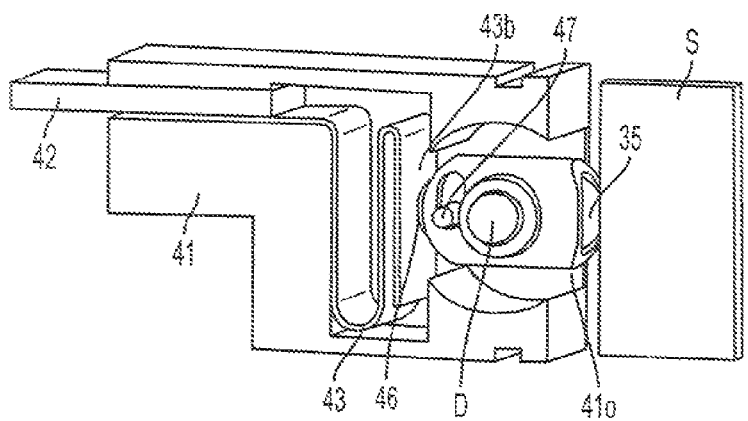
Figure 16:
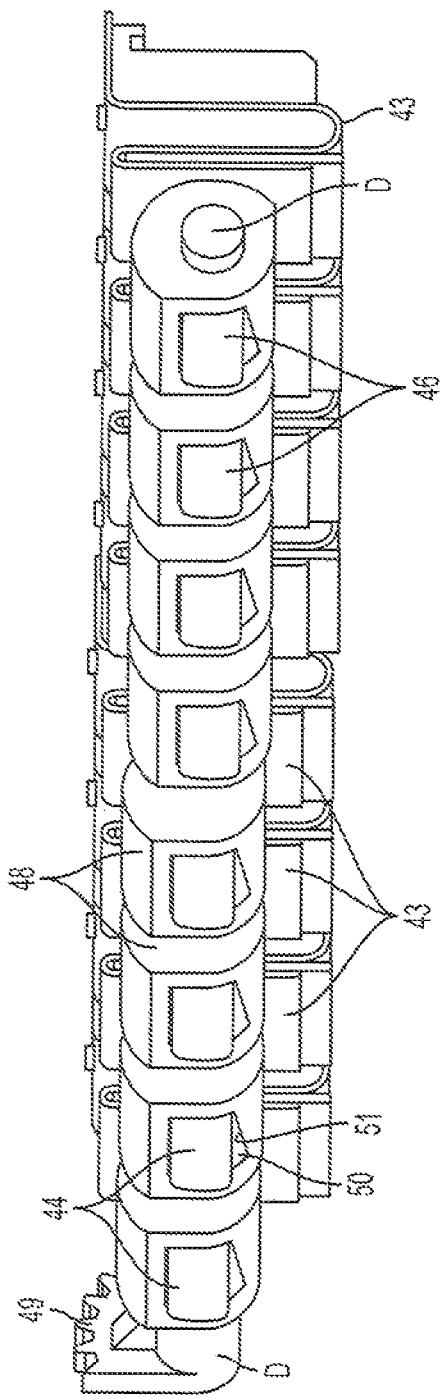
Figure 17A:
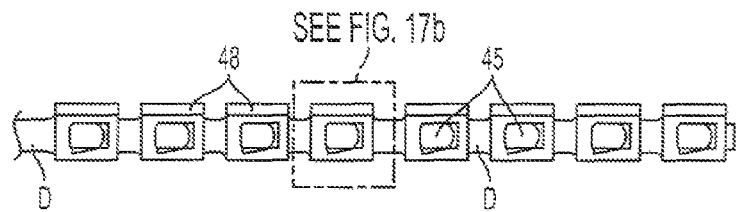
Figure 17B:
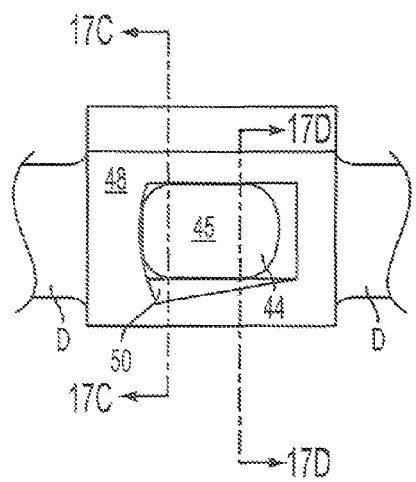
Figure 17C:
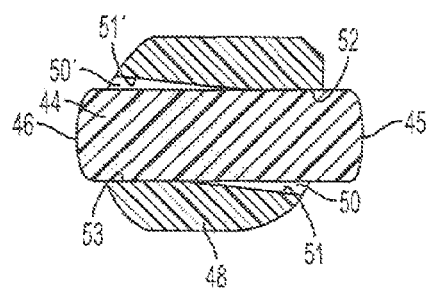

In the figures:

FIGS. 1a to 1e: show a first possible embodiment of an electrical switch according to the invention in the closed and open switching position;

FIGS. 2a to 2e: show a second possible embodiment of an electrical switch according to the invention in the closed and open switching position;

FIG. 3a to 3c show a third possible embodiment of the electrical switch according to the invention;

FIGS. 4 and 5: show possible developments of a housing half of the electrical switch with guide surfaces disposed therein for forcibly lifting off the switching element due to rotations;

FIGS. 6a and 6b: show examples of the attachment by positive fit of the current module unit to the busbar holder by means of a groove in the closed and open switching position;

FIGS. 7, 7a and 8: show perspective views of a fourth possible embodiment with a transfer element disposed between the contact element and a conductor portion;

FIGS. 9, 9a and 10: show the closed switch position of the switch in accordance with FIG. 7;

FIGS. 11 and 11a: show the open switch position of the switch in accordance with FIG. 7;

FIG. 12: shows the contact element for the switch in accordance with FIG. 7;

FIGS. 13a and 13b: show the transfer element in two different views;

FIGS. 14a to 14c: show perspective views of a fifth possible embodiment with a contact element rotatable about an axis perpendicular to the surface normal of the busbar contact surface, said contact element being disposed between a conductor portion and the busbar;

FIGS. 15a and 15b: show a side view of the switch according to the FIGS. 14a to 14c;

FIG. 16: shows a perspective view of several electrical switches according to the fifth embodiment pivotable by a common shaft;

FIGS. 17a) to e): show different views of a contact element mounted displaceably and tiltably in an area of the actuating shaft configured as a bearing.

FIGS. 1a to 1e show a first possible embodiment of an electrical switch, with the upper housing half, the drive of the electrical switch and the electrical conductor to be connected as well as the busbar not being shown. The electrical conductor to be connected is attached to the contact element 2 of the electrical switch 1, wherein a screwed/clamped connection, for example, can extend though the bore 2a. The spring-elastic supporting element 3 is rigidly disposed on the contact element 2 by means of a screwed connection 3a (screw not depicted). The supporting element 3 comprises an upper and lower conductor in the form of a conduction band which are bent in a U shape (FIGS. 1c to 1e), with the respective leg pairs 3b and 3e as well as 3c and 3d being oriented parallel relative to each other in the closed state of the switch, whereby the Lorentz force generated by the current flowing in opposite directions in the legs 3c, 3d and 3b, 3e, respectively, supports the spring force of the supporting element 3 and acts upon the tip 4t of the obliquely configured end 4b of the contact element 4, whereby the contact surface 5 of the contact element 4 is pressurized against the busbar not shown in the closed switch position.

The contact element has a toothing 4a formed about a range of angles of approx. 180 degrees or more around the partial circumference of the contact element. The circumferential area of the toothing in this case depends on the required stroke or the guide surfaces to be designed accordingly, or the inclination of the end 4b which cooperates with the supporting element 3.

Figure 1B:
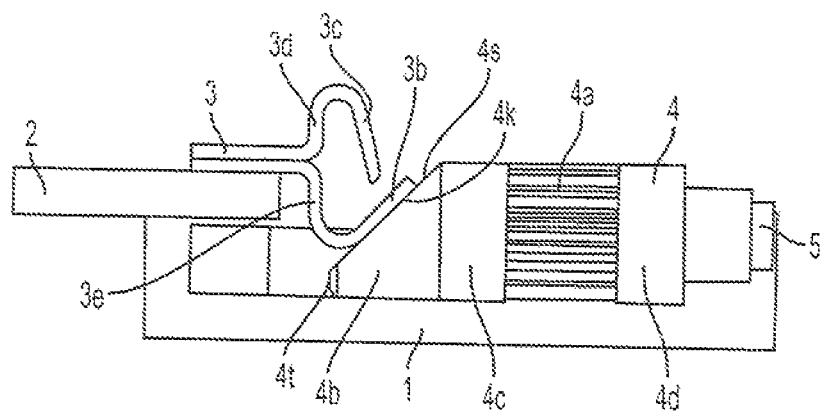

FIGS. 1a and 1b show the electrical switch in the open switching position, in which the contact element 4 with its contact surface 5 is completely retracted into the housing 1.

The oblique surface 4s of the end 4b of the contact element rests on the pressure surface formed by the free leg 3b of the supporting element 3. The tip 4t of the contact element 4 is not in contact with the supporting element 3. The contact element 4 is mounted rotatably and axially displaceably in the housing 1 of the electrical switch by means of the bearing surfaces 4c, 4d. Once the contact element 4 is caused to rotate through the toothing 4a, the oblique surface 4s or its edge 4k slides along the pressure surface 3b of the supporting element 3, until finally the tip 4t comes up against the leg 3b and the contact element 4 is thereby axially adjusted rightwards in the direction of the busbar not depicted.

Figure 1C:
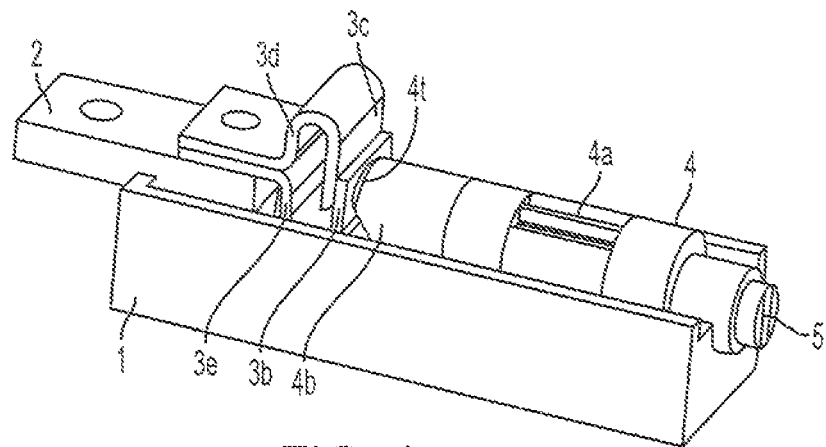
Figure 1D:
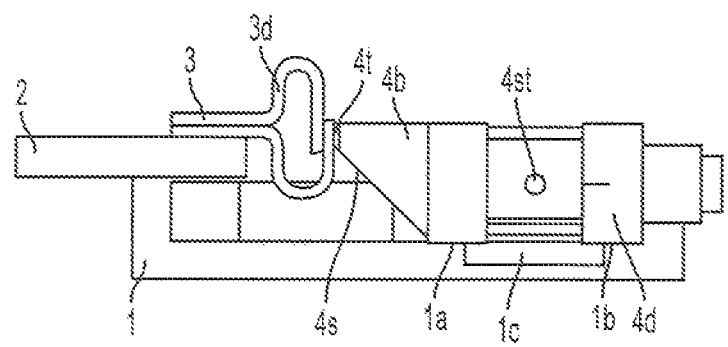
Figure 1E:
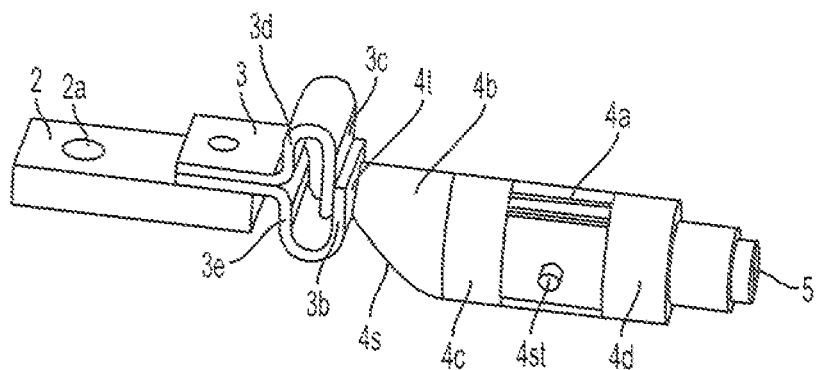
Figure 2A:
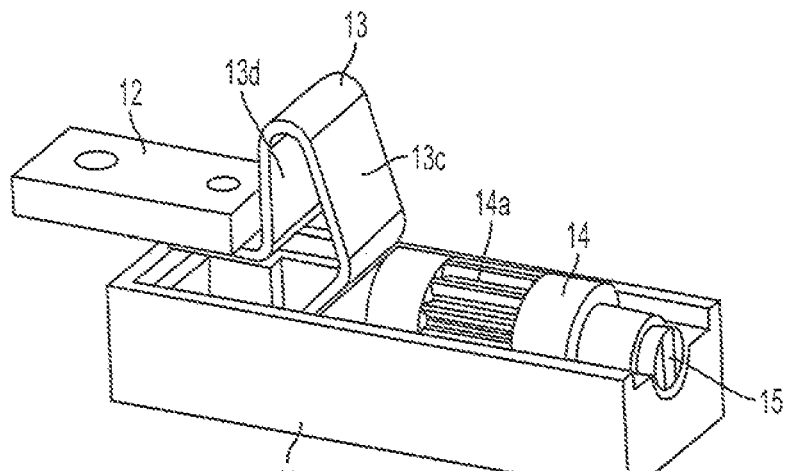
Figure 2B:
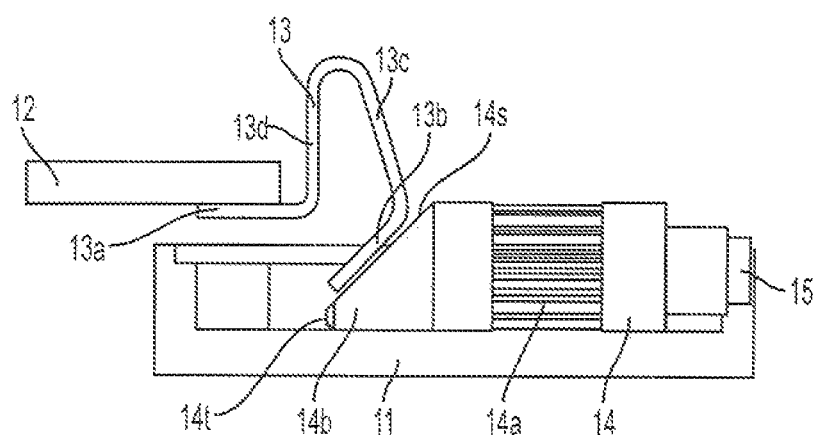
Figure 2C:
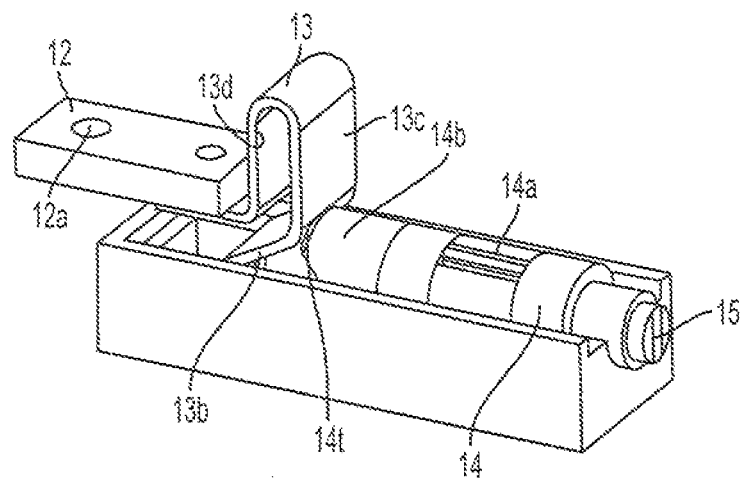
Figure 2D:
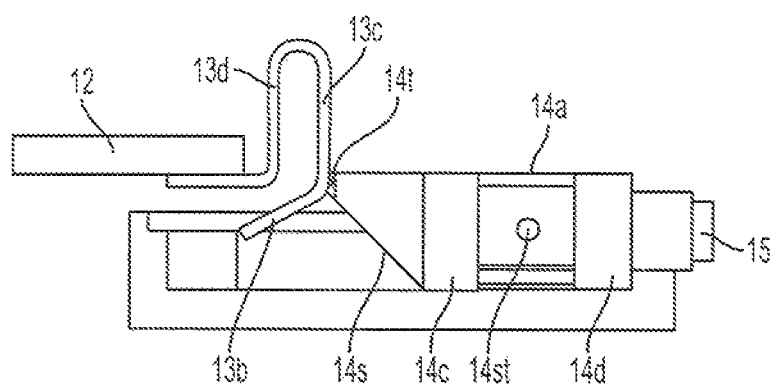
Figure 2E:
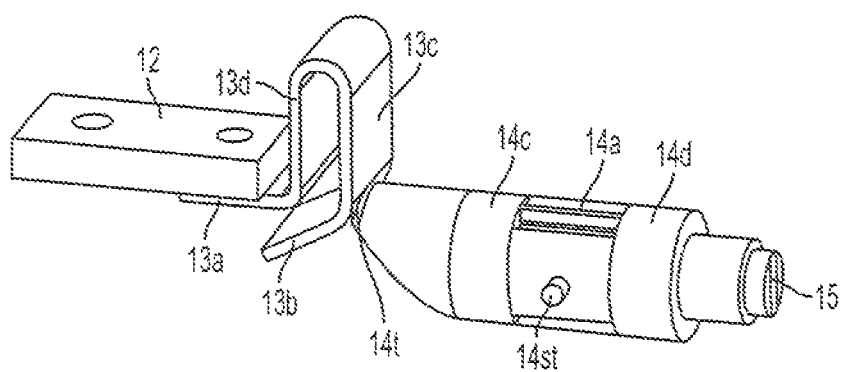

A pin-shaped projection 4st cooperating with a guide slot 1c of the housing 1 is formed on between the bearing surfaces 4c and 4d. The guide slot prevents the contact element from being adjusted in the direction of the busbar without rotation. In the last range of angles, the pin 4st is disengaged from the guiding surface or guide slot so that the contact element can be pressed against the busbar with maximum force due to the spring force of the supporting element 3 which then builds up (FIGS. 1c to 1e).

In order to loosen the contact element from the busbar, the contact element 4 is rotated back, whereby the guide pin 4s comes into contact with the guide slot 1c of the housing after a certain angle of rotation and the contact element is adjusted leftwards. The oblique surface 4s of the end portion 4b of the contact element and the supporting element 3 cooperating therewith are to be configured appropriately for the return movement to be possible.

FIGS. 2a to 2e show an alternative second embodiment of the electrical switch, with only the supporting element 13 being configured differently from the embodiment according to the FIGS. 1a to 1e. Reference numerals of the same parts or parts that have the same function in the different embodiments are chosen to be similar.

The supporting element 13 is configured as one part, with the legs 13c and 13d being set parallel to each other also in this case when the electrical switch is closed, so that the Lorentz force is maximal given a closed switching position. The free leg 13c has on its end an oblique surface 13e formed onto it, which cooperates with the oblique surface 14s of the contact element 14 as well as with its tip 14t in the same manner as in the first embodiment according to the FIGS. 1a to 1e.

FIGS. 3a to 3e show a third possible embodiment of an electrical switch according to the invention in which the supporting element is configured in a V shape, with only a small Lorentz force acting on the contact element 24 in addition to the spring force of the supporting element 23. Instead of the pin 4st or 14st of the first two embodiments, the contact element 24 comprises an oblique guiding surface 24f cooperating with the guiding surface 21f of the housing 21 and causing the return of the contact element from the closed position towards the open position.

It is of course possible that the contact element can be configured from one or more parts in all of the above-described embodiments. Advantageously, the contact element has a conductive core, in particular of copper, which is enclosed by a sleeve of non-conductive material which can form the guiding surfaces and the toothing. The sleeve with the core can be secured against, for example, rotation and axial displacement relative to each other by means of bolts or pins.

FIGS. 4 and 5 show possible designs of the housing halves of the electrical switch.

FIG. 4 shows the lower housing half 21 for receiving the contact elements of the FIGS. 3a to 3c. Here, the contact bolt 24 is mounted with a large area on the bearing surfaces 21l and 21o. 21c forms the accommodation for the drive sleeve 24a. 21w limits the stroke of the contact bolt 24. Well 21a is configured for accommodating the screwed connection of 23a. The guiding surface 21f, together with the counter surface 24f, is responsible for the return of the bolt 24 and at the same time prevents a shift from the open position without a corresponding rotational movement.

FIG. 5 shows the lower housing half 31 for receiving the contact elements of the FIGS. 1 and 2. Here, the contact bolt (4, 14) is mounted by means of the two bearing surfaces 31l. 31c forms the accommodation for the drive sleeve (4a, 14a). Well 31a is configured for accommodating the screwed connection of (3a, 13a) and the supporting element (3, 13). The guide slot 31f, together with the guide bolt (4st, 14st), is responsible for the return of the bolt (4, 14) and at the same time prevents a shift from the open position without a corresponding rotational movement.

FIGS. 6a and 6b show an example of the positive fit with the busbar holder (H). By pushing the electrical switch into the guide groove (N), the switch is firmly connected with the busbar unit. The spring force generated can act on the contact (5) independently from tolerances in the switch panel. The repulsion is absorbed in the system. Optionally, a shutter (SH) can be integrated into the holder which can also be opened or closed by the rotating mechanism provided in that case.

FIGS. 7 to 13 show illustrations of a fourth possible embodiment of the switch according to the invention. In this solution, an additional transfer part 40 is integrated into the housing. The transfer part 40 is disposed, displaceably in the longitudinal direction of the contact element 34, between the conductor portion 33 configured as a spring and the contact element 34, in the housing 31. A twist guard prevents the transfer element 40 from being able to rotate due to the force of the contact element 34 acting on it. With its frontal area 34s, the contact element 34 lies in a frontal opening 406, which can be realized by means of a bore. The inner wall of the opening 406 and the area 34s have oblique and/or arcuate guide slots or guide surfaces which ensure a good electrical contact between the contact element 34 and the transfer element consisting of conductive material. As it were, they serve for force transmission from the transfer element onto the contact element, so that, in the case of a closed switch position, it is reliably pressed by means of the spring force of the conductor 33 against the busbar not shown. The transfer element 40 is rounded on the side thereof facing towards the conductor 33 and rests flat against the conductor 33. Thus, the conductor and the transfer element 40 do not carry out any rotational movement relative to each other, so that there is only slight wear. Due to the U-shape configuration of the conductor 33, the current flowing in opposing directions through the portions 33b generates a Lorentz force acting on the contact element 34 via the transfer part 40, pressing the contact element 34 firmly against the busbar. By providing the transfer element 40, a compact constructional design is achieved in which a spring 33 that is configured simpler can be used.

The housing 31 is formed by the two housing halves 31' and 31". The housing itself forms a guide slot for the pin-like projection 34st formed onto the contact element 34. As in the previously described embodiments, the contact element comprises a toothing 34a. A toothed rack not shown extends into the opening 31z of the housing 31 and cooperates with the toothing 34a of the contact element 34. The contact element 34 is caused to rotate by adjusting the toothing. Because of the guide slot 31f, in cooperation with the projection 34st, the contact element is displaced along its longitudinal axis. In the open switch position (FIGS. 7, 8 and 11), the contact surface 35 of the contact element 34 is retracted into the housing 31 or its opening 31o. During movement into the closed switch position (FIGS. 7a, 9 and 10), the rotation of the contact element, by means of the toothed rack and the cooperation of the guide slot 31f with the projection 34st, causes a displacement of the contact element 34 in the direction of the busbar. At the same time, a relative movement is forced by the guide slots 34f and 40f between the transfer part 40 and the contact element 34, whereby the transfer part is adjusted or urged in the direction of the conductor or the spring 33. The distance between the contact surface 35 of the contact element 34 and the contact surface 40s of the transfer part 40 is thus increased when the switch is closed. A compact constructional design, preferably with regard to the constructional height, is thus achieved because the dimensions of the switch which is in the closed switch position are small.

FIGS. 14a to 14c show a fifth possible embodiment of an electrical switch according to the invention, wherein the contact element 44 is pivotable about a shaft D perpendicular to the surface normal $S_N$ of the busbar contact surface $S_K$. A conductor 43, the free end of which is configured as a spring 43b, is disposed in the housing 41. FIG. 14a shows the switch in the open position. In this case, the contacts 45 and 46 of the contact element 44 lie within the housing 41. The closing process, in which the contact element is pivoted about its axis D, is shown in FIG. 14b. The distances between the contact element 44 and the busbar S or between the contact element 44 and the conductor 43b are configured such that the contact surface 45 contacts the busbar S first. In addition, the distance of the conductor 43 and the busbar is smaller in the case of an open switch than the longitudinal dimension of the contact element 44. When the switch is closed, the contact element contacts the busbar first. The contact element 44 is mounted radially displaceably relative to its longitudinal dimension on the shaft D, and is urged by the busbar S in the direction of the conductor 43b, with the contact element being pivoted further up to its final position according to FIG. 14c.

The pin 47, which first rotates the contact element 44 about its longitudinal dimension axis during opening so that even a contact that is firmly stuck or welded is broken up by twisting, can be provided optionally. For this purpose, appropriate guide slots on the pin and the window-like opening 44f are to be provided in the contact element 44. During rotation about the longitudinal dimension axis, the contact element is not yet rotated about the axis of the shaft D. This happens only after the pin 47 has rotated the contact element 44 by up to 25°.

FIGS. 15a, 15b, 16 and 17 show a slight modification of the fifth embodiment. The rotating mechanism for twisting off the contact element 44 about its longitudinal dimension axis is formed by resting surfaces (51, 51') within the guiding member 48. The guiding member 48 can be part of a shaft D or be formed to be in one piece with it. The shaft D and/or the guiding members 48 must be fabricated from an insulating material. The guiding member 48 comprises a continuous cutout 50, 50' subdivided into the areas 48a and 48b. The cutout 50, 50' comprises the oblique resting surfaces 51, 51' and the resting surfaces 52, 53 which are formed parallel to the shaft axis. The resting surfaces 52, 53 pressurize the contact element 44 from the open switch position into the closed switch position during rotation of the shaft D. It is ensured, by the friction forces generated by the contact surfaces 45, 46 together with the busbar S or conductor 43, that the contact element 44 reliably rests on these resting surfaces 52, 53.

When the switch is opened, the contact element 44 will remain in its position at first, due to the above-described friction forces and possible weld connections between the contact element 44 and the busbar S. The contact element is first made to come up against the resting surfaces 51, 51' with its right side (see FIGS. 16 and 17b) by the resting surfaces 51, 51' configured to be oblique relative to the shaft axis and forcibly tilted about its longitudinal axis, whereby a possible bond or weld connection is reliably broken up by twisting without any great effort. After the weld connection has been broken up, or at the latest when the contact element comes up completely against the resting surfaces 51, 51' with its side walls, which takes place after a tilting movement of approx. 15°, the contact element 44 is pivoted with the shaft about the shaft axis in the direction of the open switch position (FIG. 15b). If there is no weld connection, the contact element 44 can also be pivoted by and with the shaft D about its axis even before completely coming up against the contact surfaces 51, 51', because of the respective friction forces present.

FIG. 16 shows a parallel arrangement of eight switches, the contact elements 44 of which are driven by a common shaft D. A toothed gear 49 is formed onto or attached to the shaft D, said toothed gear cooperating with a mechanical or electromechanical drive not shown. This embodiment variant achieves a more compact constructional design as regards the construction height and width than the previous embodiments.

Figure 17D:
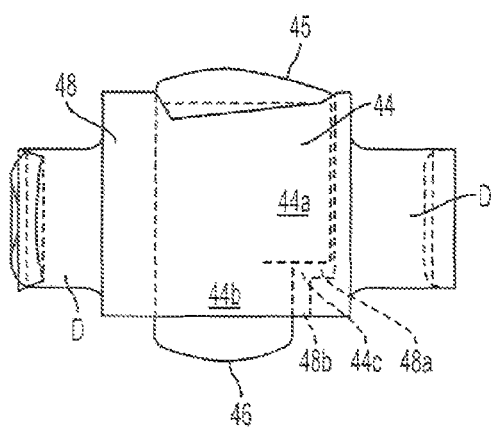
Figure 17E:
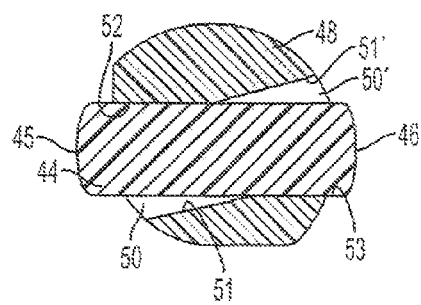

FIGS. 17a) to d) show different views of the embodiment described last. As is shown in FIG. 17d), the contact element 44 has a broad area 44a and a narrow area 44b. Area 44a, with its free front face located outside of the bearing part 48, forms the contact surface 45 which cooperates with the busbar S not depicted. Area 44b, with its front face, forms the contact surface 46 which cooperates with the conductor 43 in the closed switch position. The areas 48a and 48b of the cutout 50, 50' of the guiding member 48 are configured such that the contact element 44 is prevented by a positive fit from falling downwards (FIG. 17d) out of the guiding member 48. It is ensured by this configuration that the contact element 44 is mounted displaceably in the guiding member 48 in the direction of the connecting line between the contact surfaces 45, 46, so that it can be positioned by the contact forces of the busbar S and the conductor 43.

I claim:
1. An electrical switch for electrically coupling an electrical conductor to a busbar, the electrical switch comprising
  a contact element mounted on a shaft, with a drive for opening and closing the switch causing the shaft to rotate, wherein the contact element comprises two contact surfaces of which, in a closed switch position, a first one of the contact surfaces is in contact with the busbar and a second one of the contact surfaces is in contact with a conductor disposed on the housing, wherein the contact element is mounted on the shaft so that the entire contact element is radially displaceable with respect to a longitudinal axis of the shaft, wherein the contact element has a longitudinal axis about which the contact element is mounted tiltably and displaceably in a direction of said longitudinal axis of the contact element, in a bearing part or guiding part;
  an adjustment device configured to adjust the contact element when the switch is closed and opened, wherein the adjustment device is configured to rotate the contact element about an axis for opening and closing the switch; and
  a guiding part, wherein the guiding part comprises resting surfaces configured obliquely relative to a shaft axis of the shaft, wherein the contact element, because of the resting surfaces, is configured to first pivot about a lon- gitudinal axis of the contact element defined by a connecting line of its contact surfaces when the switch is opened.

2. The electrical switch according to claim 1, further comprising:
a supporting element that is non-rotatably disposed on the switch, the supporting element including a surface obliquely oriented relative to a rotation axis of the contact element, wherein the supporting element consists of a conductive material and is connected with a conductor that can be brought into and out of connection with the busbar through the electrical switch, and wherein the supporting element consists of a spring-elastic material, wherein the surface of the supporting element is configured to be moved away from the busbar by the contact element when the contact element is rotated out of the open position, and further wherein the supporting element comprises a conductor portion, the surface normal of which points in a direction of the busbar or the contact element, with the conductor portion forming the surface, where the conductor portion, at least in the closed switch position, is oriented parallel or substantially parallel relative to another conductor portion through which an opposite current flows, such that, due to Lorentz force, an additional force component acts on the contact element in the direction of the bus bar.

3. The electrical switch according to claim 1, wherein the shaft is disposed perpendicularly to a surface normal of a contact surface of the busbar.

4. The electrical switch according to claim 1, wherein the drive rotates or pivots the shaft for opening and closing the switch.

5. The electrical switch according to claim 1, wherein the shaft and/or the guiding part are fabricated from a non-conductive material.

6. The electrical switch according to claim 1, wherein a plurality of guiding parts for adjacently disposed switches are disposed on a common shat.

7. A switching system using a plurality of adjacently disposed electrical switches according to claim 1, wherein one contact element, all contact elements or a group of contact elements at a time can be rotated simultaneously by means of an actuating element coupled to one or more of the adjustment devices of the respective contact elements.

8. The switching system according to claim 7, wherein the actuating element can be adjusted by a drive or manually for rotating the contact element or elements.

9. The switching system according to claim 8, wherein the actuating element is a shaft or a toothed rack.

* * * * *